July 21, 1953 A. J. KYTOLA 2,646,287
VEHICLE PUSH BLOCK ATTACHMENT
Filed Oct. 12, 1951 2 Sheets-Sheet 1
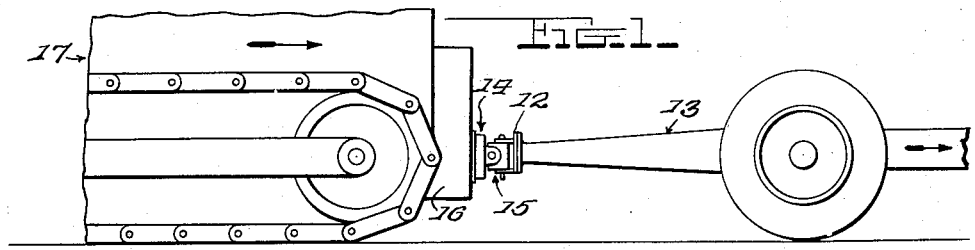
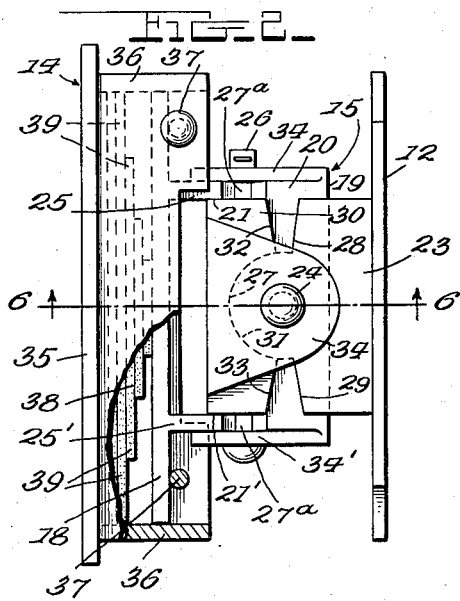
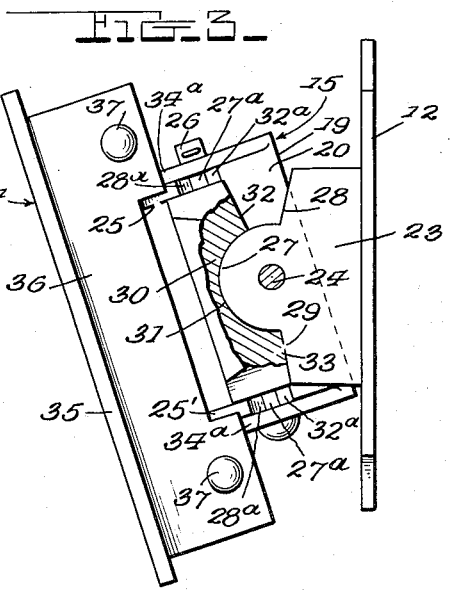
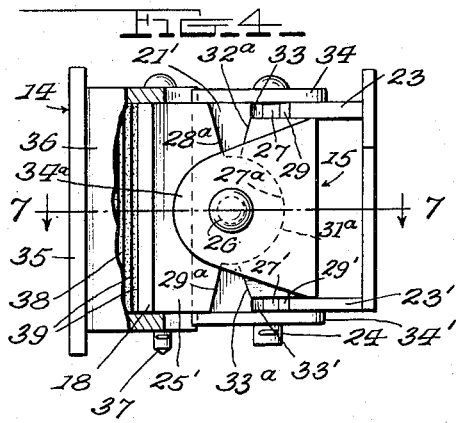
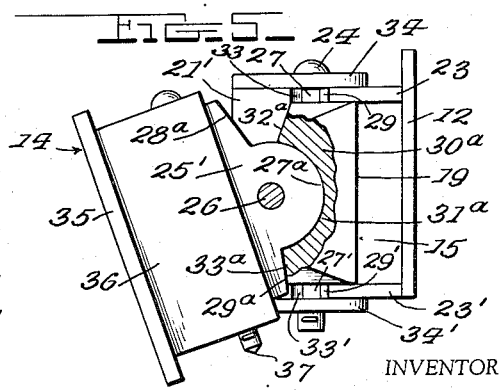
INVENTOR
Aimo J. Kytola
BY Bryant & Lowry
ATTORNEYS July 21, 1953  A. J. KYTOLA  2,646,287
VEHICLE PUSH BLOCK ATTACHMENT
Filed Oct. 12, 1951  2 Sheets-Sheet 2
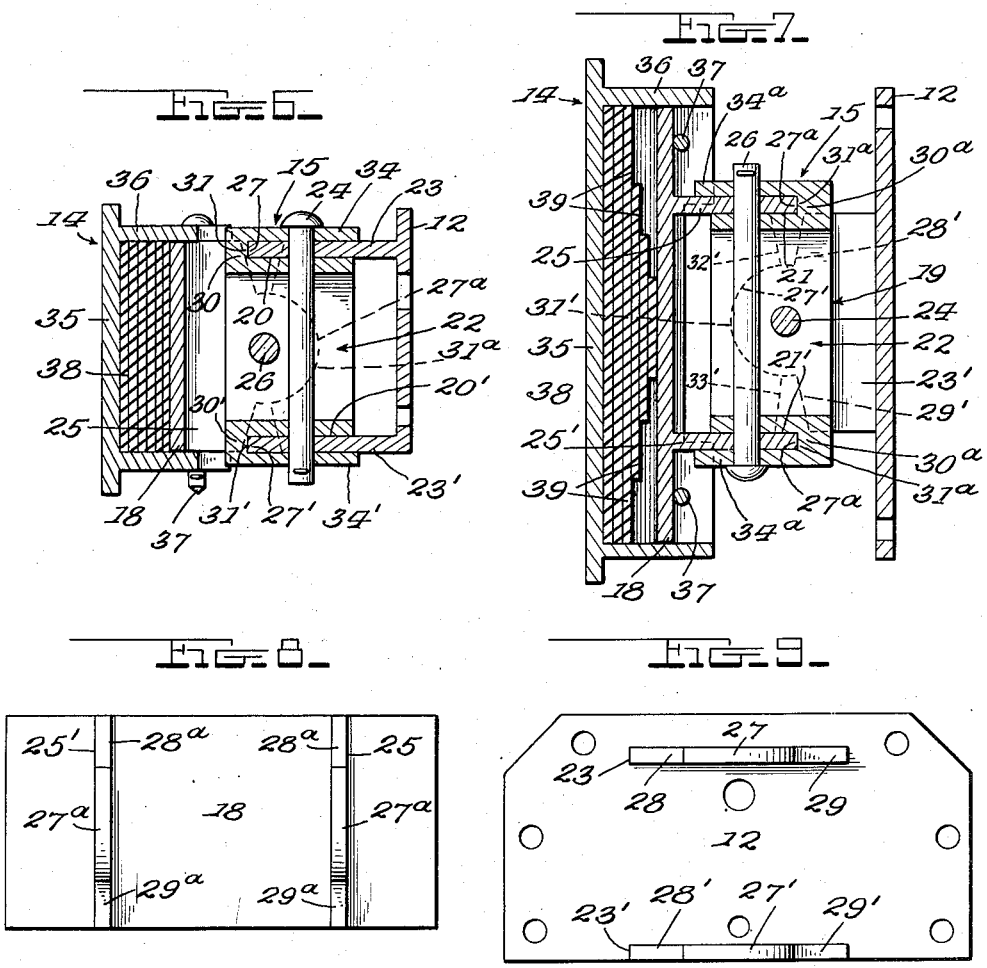
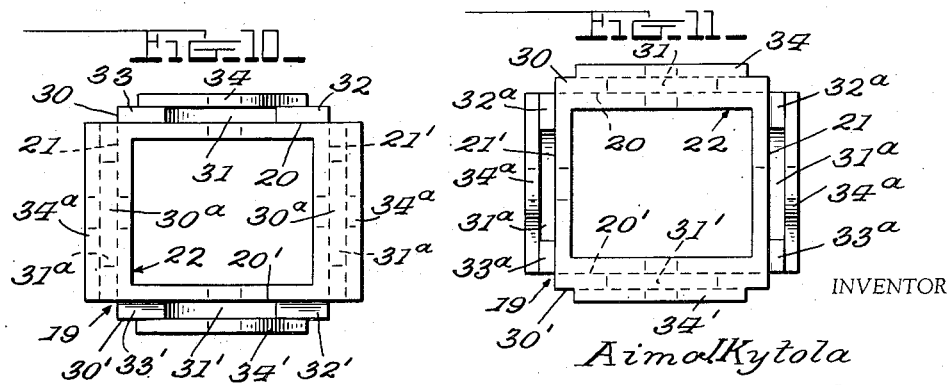
INVENTOR
Aimo J. Kytola
BY Bryant & Lowry
ATTORNEYS Patented July 21, 1953

2,646,287

UNITED STATES PATENT OFFICE 2,646,287

VEHICLE PUSH BLOCK ATTACHMENT

Aimo J. Kytola, Park River, N. Dak.

Application October 12, 1951, Serial No. 251,012

9 Claims. (Cl. 280—33.13)

This invention is an new and improved device for establishing a pushing connection between a machine to be pushed and a power driven machine which is to do the pushing. The device finds one of its most advantageous uses in establishing a pushing connection between a tractor, bulldozer or the like, and a heavy duty scraper or other dirt moving machine, but the invention is not restricted to any particular field of use.

One object of the invention is to provide a device of the class described to be mounted on the rear end of the machine to be pushed and in which a push member to be engaged by the bumper or similar part of the pushing machine is mounted for universal movement to allow it to be self-adjusting to proper position even if the pushing machine does not approach and engage it directly from the rear. This universal mounting also permits the push member to remain solidly against the bumper or the like by which it is being pushed, regardless of any normal relative deviations in the lines of travel of the two machines.

Another object of the invention is to provide a novel construction which prevents the push member from normally occupying such an extreme vertically or laterally swung position as to prohibit proper engagement of said push member by the tractor or the like.

Yet another object is to provide a novel construction in which vertical and horizontal pivot pins of the universal mounting means are relieved of all pushing strain.

A further object is to provide novel thrust surfaces which take all pushing strain and relieve the pivots of this strain without interfering in any way with the desired universal action.

A still further object is to make novel provision whereby such springing or bending of certain parts as to disengage the thrust surfaces, cannot occur.

Another object is to provide a pushing assembly including novel means whereby the initial shock upon bringing the two machines together, as well as operational shocks, are cushioned and absorbed.

Yet another object of the invention is to provide a relatively simple and inexpensive construction and one which will give years of trouble-free operation.

With the above and other objects in view that will become apparent as the nature of the invention is better understood, the same consists in the novel form, combination and arrangement of parts hereinafter more fully described, shown in the accompanying drawings, and claimed.

In the drawings:

Figure 1 is a fragmentary side elevation showing the use of the invention,

Figure 2 is a top plan view, partly broken away and in section, showing the front and rear members in parallel relation, Figure 3 is a view similar to Figure 2 but showing the front and rear members in relatively angled positions, and partly broken away to show the thrust surfaces associated with the vertical pivot, Figure 4 is a side elevation partly broken away and in section, showing the front and rear members in parallel relation, Figure 5 is a view similar to Figure 4 but showing the rear member tilted downwardly, and partly broken away to show the thrust surfaces associated with the horizontal pivot, Figure 6 is a vertical sectional view on line 6—6 of Figure 2, Figure 7 is a horizontal sectional view on line 7—7 of Figure 4, Figure 8 is a front elevation of a plate forming part of the cushioned pushing assembly, Figure 9 is a rear elevation of the front or attaching plate, Figure 10 is a front elevation of the coupling block forming part of the universal mounting means, and Figure 11 is a rear elevation of the coupling block.

A preferred construction has been shown in the drawings and will be rather specifically described, but variations may be made within the scope of the invention as claimed. Moreover, it is to be understood that such terms as "front," "rear," "upper," "lower," "vertical," and "horizontal" used herein in describing the construction are relative rather than limiting.

A vertical attaching plate 12 is provided to be bolted, riveted or welded to the rear end of a grading machine 13 or other machine to be pushed. An internally cushioned pushing assembly 14 is disposed behind the attaching plate 12, and a universal joint connection 15 is provided between said attaching plate and said pushing assembly. This connection 15 is diagrammatically shown in Figure 1 and is fully illustrated in other views. The connection 15 allows the pushing assembly 14 to swing vertically and/or horizontally as may be required when initially bringing the bumper 16 of a tractor or the like 17 into contact with said assembly 14, thus adjusting this assembly to receive the thrust upon the entire area of its rear side. The universal joint connection 15 also allows self-adjustment of the pushing assembly 14 to any required angle during forward operational movement of the machines 13 and 17. The assembly 14, due to its cushioned form, absorbs the initial shock when bringing the two machines together, as well as cushioning shocks occurring during machine operation. Pivotal movement of the assembly 14 is limited to prevent said assembly from normally occupying any position which would interfere with proper engagement of the bumper 16 with said assembly.

A vertical plate 18 is included in the assembly 14, and a rectangular block 19 is interposed between this plate 18 and the attaching plate 12. The block 19 is provided with a flat upper surface 20 and with a flat lower surface 20', which surfaces are parallel with each other. This block is also formed with two vertical end surfaces 21 and 21' which are parallel with each other and in planes at right angles to the upper and lower surfaces 20 and 20'. For reduction in weight, the block 19 is preferably provided with an opening 22 from its front side to its rear side.

An upper horizontal flange 23 and a lower horizontal flange 23' project rearwardly from the attaching plate 12 and are rigidly joined thereto. These flanges lie against the block surfaces 20 and 20' respectively, and are pivotally connected with the block 19 by means of a vertical pivot pin 24. Two vertical flanges 25 and 25' project forwardly from the plate 18 and are rigidly joined thereto. These flanges 25 and 25' lie against the end surfaces 21 and 21' of the block 19 respectively and are pivotally connected with said block 19 by means of a horizontal pivot pin 26. The vertical pivot pin 24 allows the block 19 and the pushing assembly 14 to swing horizontally, and the horizontal pin 26 allows said assembly 14 to tilt upwardly and downwardly.

The rear edge of the horizontal flange 23 is formed with a convex curvature 27 concentric with the vertical pivot pin 24 as shown in Figures 3 and 9. At the ends of the curvature 27 portions of the rear edge of the flange 23 constitute stop shoulders 28 and 29. The curved edge portion 27 is of slightly more than 180° in length and the shoulders 28 and 29 extend from the ends of said curved portion radially of the vertical pivot pin 24. The lower horizontal flange 23' is shaped at its rear edge in conformity with the rear edge of the upper flange 23, as indicated at 27', 28' and 29'. See more particularly Figure 9.

The upper side of the connecting block 19 is provided with an upwardly projecting portion 30 shown in Figures 2, 3, 6, 10, and 11. This portion 30 is provided with a concavely curved front edge portion 31 which abuts the convexly curved rear edge portion 27 of the flange 23 illustrated in Figures 3 and 6. Thus, the pivot pin 24 is relieved of all pushing strain.

The upward projection 30 is also provided with front end portions 32 and 33 constituting stop shoulders which are cooperable with the stop shoulders 28 and 29 of the flange 23, respectively. The coacting stop shoulders limit the lateral swing of the block 19 and pushing assembly 14 about the vertical pivot pin 24.

The projection 30 is provided with a forwardly projecting lug 34 (Figures 2, 4, 6, and 10) which laps onto the flange 23 and overcomes any possibility of this flange springing or bending from its proper position. The pivot pin 24 extends through this lug 34.

At the lower side of the block 19 the construction is the same as above described. The reference characters 30', 31', 32', 33' and 34' therefore indicate formations corresponding to those above given the numerals 30 to 34.

The front edges of the flanges 25 and 25' are provided with formations 27ª, 28ª, and 29ª corresponding to the formations 27, 28, and 29 above described. Also, the ends of the block 19 have formations 30ª, 31ª, 32ª, 33ª, and 34ª corresponding to the formations 30 to 34.

It will thus be seen that all pushing strain is taken from both pivots 24 and 26 and that the pivotal movements of the parts both vertically and horizontally are restricted to prevent the pushing assembly 14 from ever occupying such a normal position that it could not be properly engaged by the pushing machine 17. Also, the coacting curved thrust shoulders are prevented from becoming disengaged even under abnormal strain.

It was above stated that the plate 18 was included in the pushing assembly 14. This assembly also includes a rear push plate 35 having a forwardly projecting four-sided wall 36 which surrounds the plate 18. Pins 37 extend through the wall 36 and bear against the front side of the plate 18, and a cushion 38 is interposed between the two plates 18 and 35. This cushion may well be formed from several plies of rubber belting cemented together, a number of the plies toward the front being of gradually shortened length to provide its end portions with stepped formations 39 as best seen in Figure 7. The cushion 38 absorbs shocks which might otherwise have a tendancy to damage parts of the push block or parts of the machines 13 and 17, and said cushion becomes more and more resistant as the plate 35 moves toward the plate 18.

From the foregoing detailed description it will be seen that novel and advantageous construction has been provided for carrying out the desired ends, and while preferences have been disclosed, attention is again invited to the possibility of making variations without departing from the spirit and scope of the invention as claimed.

I claim:

1. A pushing device comprising a front member, a rear member, one of said members being adapted for attachment to one mobile machine, the other of said members being adapted to abut another mobile machine, a coupling block between said members, upper and lower flanges projecting from one of said members and disposed over and under said block respectively, vertical-axis pivot means connecting said upper and lower flanges with said block, laterally spaced flanges projecting from the other of said members and straddling said block, and horizontal-axis pivot means connecting said laterally spaced flanges with said blocks, said upper and lower flanges having curved thrust edges concentric with said vertical-axis pivot means, said laterally spaced flanges having curved thrust edges concentric with said horizontal-axis pivot means, said block having arcuate thrust shoulders abutting said thrust edges, whereby all of said pivot means are relieved of pushing strain.

2. A pushing device comprising a front member, a rear member, one of said members being adapted for attachment to one mobile machine, the other of said members being adapted to abut another mobile machine, a coupling block between said members, upper and lower flanges projecting from one of said members and disposed over and under said block respectively, vertical-axis pivot means connecting said upper and lower flanges with said block, laterally spaced flanges projecting from the other of said members and straddling said block, and horizontal-axis pivot means connecting said laterally spaced flanges with said blocks, said upper and lower flanges having curved thrust edges concentric with said vertical-axis pivot means, said laterally spaced flanges having curved thrust edges concentric with said horizontal-axis pivot means, said block having arcuate thrust shoulders abutting said thrust edges, whereby all of said pivot means are relieved of pushing strain, said block having lugs projecting beyond said thrust shoulders and lapping onto said flanges to prevent outward springing or bending of the latter.

3. A pushing device comprising a front member, a rear member, one of said members being adapted for attachment to one mobile machine, the other of said members being adapted to abut another mobile machine, a coupling block between said members, upper and lower flanges projecting from one of said members and disposed over and under said block respectively, vertical-axis pivot means connecting said upper and lower flanges with said block, laterally spaced flanges projecting from the other of said members and straddling said block, and horizontal-axis pivot means connecting said laterally spaced flanges with said blocks, said upper and lower flanges having curved thrust edges concentric with said vertical-axis pivot means, said laterally spaced flanges having curved thrust edges concentric with said horizontal-axis pivot means, said block having arcuate thrust shoulders abutting said thrust edges, whereby all of said pivot means are relieved of pushing strain, said block and flanges having coacting stop means for limiting the movements of parts about said pivot means.

4. A pushing device comprising a front member, a rear member, one of said members being adapted for attachment to one mobile machine, the other of said members being adapted to abut another mobile machine, a coupling block between said members, upper and lower flanges projecting from one of said members and disposed over and under said block respectively, vertical-axis pivot means connecting said upper and lower flanges with said block, laterally spaced flanges projecting from the other of said members and straddling said block, and horizontal-axis pivot means connecting said laterally spaced flanges with said blocks, said upper and lower flanges having curved thrust edges concentric with said vertical-axis pivot means, said laterally spaced flanges having curved thrust edges concentric with said horizontal-axis pivot means, said block having arcuate thrust shoulders abutting said thrust edges, whereby all of said pivot means are relieved of pushing strain, said block having lugs projecting beyond said thrust shoulders and lapping onto said flanges to prevent outward springing or bending of the latter, said block and flanges having coacting stop means for limiting the movements of parts about said pivot means.

5. A pushing device comprising a front member, a rear member, one of said members being adapted for attachment to one mobile machine, the other of said members being adapted to abut another mobile machine, a coupling block between said members, upper and lower flanges projecting from one of said members and disposed over and under said block respectively, vertical-axis pivot means connecting said upper and lower flanges with said block, laterally spaced flanges projecting from the other of said members and straddling said block, and horizontal-axis pivot means connecting said laterally spaced flanges with said blocks, said upper and lower flanges having convexly curved edge portions concentric with said vertical-axis pivot means, said upper and lower flanges also having straight edge portions at the ends of said curved edge portions, said straight edge portions being disposed radially of said vertical-axis pivot means, said block having concavely curved thrust shoulders abutting said curved edge portions, said block also having straight stop shoulders at the ends of said thrust shoulders, said stop shoulders being cooperable with said straight edge portions to limit the horizontal turning movements of said block, said block having lugs projecting beyond said thrust shoulders and lapped onto said upper and lower flanges to prevent outward springing or bending of the latter.

6. A pushing device comprising a front member, a rear member, one of said members being adapted for attachment to one mobile machine, the other of said members being adapted to abut another mobile machine, a coupling block between said members, upper and lower flanges projecting from one of said members and disposed over and under said block respectively, vertical-axis pivot means connecting said upper and lower flanges with said block, laterally spaced flanges projecting from the other of said members and straddling said block, said horizontal-axis pivot means connecting said laterally spaced flanges with said blocks, said laterally spaced flanges having convexly curved edge portions concentric with said horizontal-axis pivot means, said laterally spaced flanges also having straight edge portions at the ends of said curved edge portions, said straight edge portions being disposed radially of said horizontal-axis pivot means, said block having concavely curved thrust shoulders abutting said curved edge portions, said block also having straight stop shoulders at the ends of said thrust shoulders, said stop shoulders being cooperable with said straight edge portions to limit the pivotal movement about said horizontal-axis pivot means, said block having lugs projecting beyond said thrust shoulders and lapped onto said laterally spaced flanges to prevent outward springing or bending of the latter.

7. A pushing device comprising a front member, a rear member, one of said members being adapted for attachment to one mobile machine, the other of said members being adapted to abut another mobile machine, a universal joint connecting said front and rear members, a push plate outwardly spaced from one of said members, said push plate having a wall surrounding said one of said members, an elastic cushion between said one of said members and said push plate, and means for preventing movement of said one of said members from said wall.

8. A structure as specified in claim 7, said elastic cushion having stepped ends.

9. A structure as specified in claim 7, said elastic cushion consisting of plies of flat elastic material, some of said plies being shortened to impart a stepped formation to the ends of the cushion.

AIMO J. KYTOLA.

References Cited in the file of this patent

UNITED STATES PATENTS

| Number | Name | Date |
|---|---|---|
| 1,378,793 | Johnson | May 17, 1921 |
| 1,628,038 | Draper | May 10, 1927 |
| 1,746,954 | McManus | Feb. 11, 1930 |
| 1,813,858 | Lambrecht | July 7, 1931 |
| 1,814,427 | Becker | July 14, 1931 |
| 2,418,554 | Kadz | Apr. 8, 1947 |

FOREIGN PATENTS

| Number | Country | Date |
|---|---|---|
| 522,440 | France | Mar. 31, 1921 |